United States Patent
Touitou et al.

(10) Patent No.: US 7,979,694 B2
(45) Date of Patent: Jul. 12, 2011

(54) USING TCP TO AUTHENTICATE IP SOURCE ADDRESSES

(75) Inventors: Dan Touitou, Ramat Gan (IL); Guy Pazi, Ramat HaSharon (IL); Yehiel Shtein, Tel Aviv (IL); Rephael Tzadikario, Kfar Saba (IL)

(73) Assignee: Cisco Technology, Inc., San Jose, CA (US)

( * ) Notice: Subject to any disclaimer, the term of this patent is extended or adjusted under 35 U.S.C. 154(b) by 1984 days.

(21) Appl. No.: 10/792,653

(22) Filed: Mar. 2, 2004

(65) Prior Publication Data

US 2005/0021999 A1  Jan. 27, 2005

Related U.S. Application Data

(60) Provisional application No. 60/451,601, filed on Mar. 3, 2003.

(51) Int. Cl.
 *H04L 29/08* (2006.01)
(52) U.S. Cl. ........ 713/154; 713/150; 713/153; 709/229; 726/25
(58) Field of Classification Search .................. 726/25; 713/153–154; 709/229
See application file for complete search history.

(56) References Cited

U.S. PATENT DOCUMENTS

| | | | |
|---|---|---|---|
| 5,067,074 A | 11/1991 | Farel et al. | |
| 5,511,122 A | 4/1996 | Atkinson | |
| 5,689,508 A | 11/1997 | Lyles | |
| 5,826,014 A | 10/1998 | Coley et al. | |
| 5,841,775 A | 11/1998 | Huang | |
| 5,898,830 A | 4/1999 | Wesinger, Jr. et al. | |
| 5,905,730 A | 5/1999 | Yang et al. | |
| 5,958,053 A * | 9/1999 | Denker | 726/1 |
| 6,005,926 A | 12/1999 | Mashinsky | |
| 6,055,263 A | 4/2000 | Karube et al. | |
| 6,072,800 A | 6/2000 | Lee | |
| 6,134,217 A | 10/2000 | Stiliadis et al. | |
| 6,182,226 B1 | 1/2001 | Reid et al. | |
| 6,185,680 B1 | 2/2001 | Shimbo et al. | |
| 6,208,652 B1 | 3/2001 | Stephens et al. | |
| 6,304,913 B1 | 10/2001 | Rune | |

(Continued)

FOREIGN PATENT DOCUMENTS

CA 2456902 A1 2/2003

(Continued)

OTHER PUBLICATIONS

Bennett. J.C.R. et al., "Hierarchical Packet Fair Queueing Algorithms", 1996.

(Continued)

*Primary Examiner* — Edan Orgad
*Assistant Examiner* — Yi-Chen Shaw
(74) *Attorney, Agent, or Firm* — Fish & Richardson P.C.

(57) ABSTRACT

A method for authenticating communication traffic includes intercepting a request directed over a network from a source address to open a connection to a target computer in accordance with a handshake procedure specified by a predetermined communication protocol. A reply to the request that deviates from the specified handshake procedure is sent to the source address. A response from the source address to the reply is analyzed in order to make an assessment of legitimacy of the source address. Upon determining, based on the assessment, that the source address is legitimate, the target computer is permitted to complete the handshake procedure so as to open the connection with the source address.

69 Claims, 7 Drawing Sheets

U.S. PATENT DOCUMENTS

| | | | |
|---|---|---|---|
| 6,314,463 B1 | 11/2001 | Abbott et al. | |
| 6,335,927 B1 | 1/2002 | Elliott et al. | |
| 6,351,775 B1 | 2/2002 | Yu | |
| 6,381,638 B1* | 4/2002 | Mahler et al. | 709/220 |
| 6,397,335 B1 | 5/2002 | Franczek et al. | |
| 6,502,135 B1 | 12/2002 | Munger et al. | |
| 6,513,122 B1 | 1/2003 | Magdych et al. | |
| 6,587,438 B1* | 7/2003 | Brendel | 370/238 |
| 6,725,378 B1* | 4/2004 | Schuba et al. | 726/13 |
| 6,789,203 B1 | 9/2004 | Belissent | |
| 6,816,910 B1* | 11/2004 | Ricciulli | 709/237 |
| 6,957,348 B1* | 10/2005 | Flowers et al. | 726/23 |
| 7,043,756 B2* | 5/2006 | Tsafnat et al. | 726/23 |
| 7,043,759 B2* | 5/2006 | Kaashoek et al. | 726/25 |
| 7,058,718 B2* | 6/2006 | Fontes et al. | 709/228 |
| 7,152,105 B2* | 12/2006 | McClure et al. | 709/224 |
| 7,254,133 B2* | 8/2007 | Govindarajan et al. | 370/394 |
| 7,337,470 B2* | 2/2008 | Katz et al. | 726/22 |
| 2001/0042200 A1 | 11/2001 | Lamberton et al. | |
| 2002/0083175 A1 | 6/2002 | Afek et al. | |
| 2003/0070096 A1 | 4/2003 | Pazi et al. | |
| 2003/0110274 A1 | 6/2003 | Pazi et al. | |
| 2003/0172289 A1* | 9/2003 | Soppera | 713/200 |
| 2004/0054924 A1* | 3/2004 | Chuah et al. | 713/201 |

FOREIGN PATENT DOCUMENTS

| | | |
|---|---|---|
| WO | WO-02/33870 A2 | 4/2002 |

OTHER PUBLICATIONS

Bennett, J.C.R., et al., "High Speed, Scalable, and Accurage Implementation of Fair Queueing Algorithms in ATM Networks", 1996.

Bennett, J.C.R., et al., "WF2Q: Worst-Case Fair Weighted Fair Queueing", 1996.

Chiussi, F.M. et al., Implementing Fair Queueing in ATM Switches: The Discrete-Rate Approach:, 1998.

Chiussi, F.M. et al., "Minimum-Delay Self-Clocked Fair Queueing Algorithm for Packet-Switched Networks", 1998.

Demers, A., et al., "Analysis and Simulation of Fair Queueing Algorithms". 1989 Association for Computing Machinery.

Eckhardt, D.A. et al., "Effort-limited Fair (ELF) Scheduling for wireless Networks", IEEE INFOCOM 2000.

Golestani, S. J. "Network Delay Analysis of a Class of fair Queueing Algorithms", IEEE Journal on Selected Areas in Communications, vol. 13, No. 6, Aug. 1995, pp. 1057-1070.

Greenberg, Albert G. et al., "How Fair is Fair Queuing?" Journal of the Association for Computing Machinery, vol. 39, No. 3, Jul. 1992, pp. 568-598.

Parekh, A.K.J. "A Generalized Processor Sharing Approach to Flow Control in Integrated Services Networks", Ph.D. Dissertation Massachusetts Institute of Technology, Feb. 1992.

Parekh, A.K.J. "A Generalized Processor Sharing Approach to Flow Control in Integrated Services Networks: The Multiple Node Case", IEEE/ACM Transactions on Networking vol. 2, No. 2, Apr. 1994, pp. 137-150.

Parekh, A.K.J. "A Generalized Processor Sharing Approach to Flow Control in Integrated Services Networks: The Single-Node Case", IEEE/ACM Transactions on Networking vol. 1, No. 3, Jun. 1993, pp. 344-357.

"Quality of Service Networking", downloaded from the web (address: http://www.cisco.com/univercd/cc/td/doc/cisintwk/ito_doc/qos.htm), Cisco Systems, Inc. 2002.

Rexford, J.L. et al., "Hardware Efficient Fair Queueing Architextures for high-speed networks", IEEE 1996, pp. 5d.2.1-5d.2.9.

Shreedhar M. et al., "Efficient Fair Queueing Using Deficit Round-Robin", IEEE/ACM Transactions on networking vol. 4, No. 3, Jun. 1996, pp. 375-385.

Stiliadis, D. et al., "Frame-Based Fair Queueing: A New Traffic Scheduling Algorithm for Packet-Switched Networks", Jul. 1995, pp. 1-43.

Mockapetris, "Domain Names—Implementation and Specification", RFC 1035, 1987.

D. Eastlake, "Domain Name System Security Extensions", RFC 2535, Mar. 1999.

Mockapetris, "Domain Names—Concepts and Facilities", RFC 1034, 1987.

"Transmission Control Protocol", DARPA Internet Program, RFC 793, Sep. 1981.

A Supplementary Partial European Search Report dated Feb. 18, 2001, which issued during the prosecution of Applicant's European Patent Application No. EP04716687.

* cited by examiner

USING TCP TO AUTHENTICATE IP SOURCE ADDRESSES

CROSS-REFERENCE TO RELATED APPLICATIONS

This application claims the benefit of U.S. Provisional Patent Application 60/451,601, filed Mar. 3, 2003. This application is also related to U.S. patent application Ser. No. 09/929,877, filed Aug. 14, 2001; to U.S. patent application Ser. No. 10/232,993, filed Aug. 29, 2002; and to a U.S. provisional patent application entitled "Upper-Level Protocol Authentication," filed Jan. 26, 2004. All of these related applications are assigned to the assignee of the present patent application, and their disclosures are incorporated herein by reference.

FIELD OF THE INVENTION

The present invention relates generally to computer networks, and specifically to methods and systems for protecting against denial of service attacks in computer networks.

BACKGROUND OF THE INVENTION

In a Denial-of-Service (DoS) attack, an attacker bombards a victim network or server with a large volume of message traffic. Handling this traffic consumes the victim's available bandwidth, CPU capacity, or other critical system resources, and eventually brings the victim to a situation in which it is unable to serve its legitimate clients. Distributed DoS (DDoS) attacks can be even more damaging, as they involve creating artificial network traffic from multiple sources simultaneously. In a "conventional" massive-bandwidth attack, the source of the attack may be traced with the help of statistical analysis of the source Internet Protocol (IP) addresses of incoming packets. The victim can subsequently filter out any traffic originating from the suspect IP addresses, and can use the evidence to take legal action against the attacker. Many attacks, however, now use "spoofed" IP packets—packets containing a bogus IP source address—making it more difficult for the victim network to defend itself against attack.

The Transmission Control Protocol/Internet Protocol (TCP/IP) suite is the most widely-used transport protocol in digital packet networks today. TCP is a connection-oriented, end-to-end, full-duplex protocol, which provides for reliable inter-process communication between pairs of processes in host computers. The information exchanged between TCP peers is packed into datagrams known as segments, each comprising a TCP header followed by payload data. The segments are transported over the network in IP packets. TCP is described by Postel in RFC 793 of the U.S. Defense Advanced Research Projects Agency (DARPA), entitled "Transmission Control Protocol: DARPA Internet Program Protocol Specification" (1981), which is incorporated herein by reference. The description given hereinbelow of certain features of TCP is based on information in RFC 793, and readers should refer to the RFC for further details.

Each octet transmitted in a TCP segment is assigned a sequence number, which is used by the receiving computer to recover from damage, loss and duplication of packets and to reorder segments that are delivered out of order. Upon receiving a segment, the receiver is expected to give a positive acknowledgment (ACK), by returning a packet to the sender in which the "ACK" control bit is set in the TCP header. If the sender does not receive the ACK within a timeout interval, it retransmits the data. Since TCP is a full-duplex protocol, the header of each segment contains fields for both the sequence number and an acknowledgment number. The sequence number field holds the sequence number of the first data octet in the segment (or an initial sequence number, ISN, in the case of a SYN packet, as described below). The acknowledgment number field contains the value of the next sequence number the sender of the segment is expecting to receive over the TCP connection. The acknowledgment number is thus determined by the highest sequence number in the last segment that was received. To govern the amount of data sent by the sender, the receiver returns a "window" with every ACK, indicating a range of acceptable sequence numbers beyond the last segment successfully received.

To establish a TCP connection, the two participating computers use the well-known "three-way handshake" to synchronize on each other's initial sequence numbers. The handshake is based on an exchange of connection-establishing segments carrying a control bit called "SYN" in their segment headers, along with the initial sequence numbers. Each side must also receive the other side's initial sequence number and send a confirming acknowledgment. To initiate the connection, computer A sends a SYN packet to computer B, indicating its initial sequence number (ISN). Computer B responds with a SYN-ACK packet, giving its own ISN and acknowledging the ISN sent by computer A (by setting the ACK bit and placing the value ISN+1 in the acknowledgment number field). Computer A finally responds with an ACK packet, acknowledging the ISN sent by computer B, and the connection is thus established.

The TCP segment header also contains a "RST" control bit, which is used when it is necessary to reset a TCP connection that is not properly synchronized. As a general rule, a RST packet (in which the RST bit is set) is sent whenever a segment arrives which apparently is not intended for the current connection as long as the connection is not in an "established" state. Thus, for example, if one of the computers in the course of establishing a TCP connection receives an ACK packet that contains an unexpected acknowledgment number, the receiving computer will return a RST packet to the sending computer.

SUMMARY OF THE INVENTION

Embodiments of the present invention provide methods and systems for authenticating communication traffic on a network, and particularly traffic carried by connection-oriented protocols, such as TCP. These methods are typically carried out by a guard device, which intercepts incoming connection requests sent over the network from remote computers to a target computer, such as a server, in order to protect the target computer from malicious traffic. Such methods are particularly useful in detecting and blocking spoofed traffic during DDoS attacks, but may also be used for authenticating source addresses and connection requests for other purposes.

The guard device uses conventional features of the connection-oriented protocol in a novel way in order to verify that the remote computer requesting a connection is legitimate. The term "legitimate" in this context means that the source address from which the connection request was sent is actually assigned to a real computer, and that this computer actually initiated the connection request. Connection requests from spoofed source addresses are thus blocked. The authentication process is generally transparent, in the sense that upon successful completion of the process, the remote computer is permitted to connect directly to the target computer without further interruption and without deviation from the normal protocol.

In some embodiments of the present invention, the guard device intercepts TCP SYN packets directed, in accordance with the three-way handshake procedure, from a source address to the address of the target computer. The guard device sends a reply to the source address that deviates from the expected handshake reply. Typically, the guard device sends a TCP ACK packet, rather than a SYN-ACK packet as specified by normal TCP procedure. Certain contents of the TCP header in the ACK packet, such as the acknowledgment number, are chosen so as to elicit a certain response from the source address (or in some cases to elicit no response) if the source address is legitimate. The guard device intercepts and analyzes the response (if any) received from the source address, and thus assesses the legitimacy of the source address. After determining in this manner that the source address is legitimate, the guard device permits the target computer to complete the handshake procedure so as to open the connection.

A number of variations on this basic authentication procedure are described hereinbelow. In some embodiments, when the guard device is unable to determine with sufficient certainty that the source address is legitimate, the guard device may serve as a TCP proxy between the source address and the target computer. In this manner, the remote computer is permitted to connect only indirectly with the target computer, via the guard device. Because of the high overhead associated with TCP proxy operation, however, the guard device avoids this mode of operation when possible and causes the remote computer to connect directly to the target computer whenever the guard device has ascertained that the source address is legitimate.

There is therefore provided, in accordance with an embodiment of the present invention, a method for authenticating communication traffic, including:

intercepting a request directed over a network from a source address to open a connection to a target computer in accordance with a handshake procedure specified by a predetermined communication protocol;

sending to the source address a reply to the request that deviates from the specified handshake procedure;

analyzing a response from the source address to the reply in order to make an assessment of legitimacy of the source address; and upon determining, based on the assessment, that the source address is legitimate, permitting the target computer to complete the handshake procedure so as to open the connection with the source address.

In disclosed embodiments, the protocol includes a Transmission Control Protocol (TCP), and the handshake procedure includes a TCP three-way handshake. Typically, intercepting the request includes intercepting a TCP SYN packet, and sending the reply includes sending a TCP ACK packet.

In some embodiments, intercepting the request includes intercepting a first incoming packet including a field that is indicative of a number of hops traversed by the first incoming packet since having been sent from the source address, and making a record of a first value of the field appearing in the first incoming packet, and analyzing the response includes receiving a second incoming packet from the source address, and reading from the second incoming packet a second value of the field that is indicative of the number of hops traversed by the second incoming packet, and comparing the first and second values of the field in order to assess the legitimacy of the source address. Typically, making the record includes encoding the first value of the field in an outgoing packet, and sending the reply includes sending the outgoing packet to the source address, so as to cause the encoded first value to be incorporated in the second incoming packet.

In some of these embodiments, the first, second and third packets are Internet Protocol (IP) packets, and the field includes a Time-To-Live (TTL) field in a header of the IP packets. Typically, the protocol includes a Transmission Control Protocol (TCP), and encoding the first value includes encoding the first value of the TTL field in an acknowledgment number field in a TCP header of the second packet.

In other embodiments, intercepting the request includes intercepting a first packet including a sequence number, and sending the reply includes sending a second packet to the source address, acknowledging the first packet and containing an acknowledgment number based on the sequence number in accordance with the protocol, and analyzing the response includes disqualifying the source address if the source address responds to the second packet. Typically, analyzing the response includes determining the source address to be legitimate if the source address retransmits the first packet without responding to the second packet.

Optionally, the method includes opening a proxy connection between a guard device and the source address, and permitting the source address to access the target computer only via the proxy connection as long as the legitimacy of the source address is not established. The method may then further include making a determination that the source address is legitimate responsively to use of the proxy connection, and responsively to the determination, causing the connection to be opened directly between the source address and the target computer while closing the proxy connection.

There is also provided, in accordance with an embodiment of the present invention, a method for authenticating communication traffic, including:

intercepting a SYN packet directed over a network from a source address to a target computer in accordance with a Transmission Control Protocol (TCP);

reading from the SYN packet a first value of a Time-To-Live (TTL) field;

in reply to the SYN packet, sending a TCP ACK packet to the source address, while encoding the first value of the TTL field in a TCP acknowledgment number of the ACK packet;

receiving a TCP RST packet sent from the source address in response to the ACK packet;

reading a TCP sequence number and a second value of the TTL field from the RST packet; and comparing the TCP sequence number to the second value of the TTL field in order to assess legitimacy of the source address.

Typically, comparing the TCP sequence number includes decoding the TCP sequence number in order to recover the first value of the TTL field, and determining the source address to be legitimate if the first and second values of the TTL field are equal to within a predetermined tolerance.

In some embodiments, the method includes sending a TCP SYN-ACK packet to the source address after a timeout period and, upon receiving an incoming TCP ACK packet from the source address in response to the SYN-ACK packet, permitting the source address to communicate with the target computer even if no RST packet was received in response to the ACK packet sent to the source address. Typically, permitting the source address to communicate includes opening a TCP proxy connection between a guard device and the source address, and permitting the source address to access the target computer via the proxy connection.

In another embodiment, the method includes, upon failing to determine the source address to be legitimate based upon receiving the RST packet, reading a TCP sequence number from the SYN packet, sending a further ACK packet to the source address, while setting a TCP acknowledgment number of the further ACK packet to a value greater by one than the sequence number of the SYN packet, and assessing the legitimacy of the source address based upon a further response received from the source address following the further ACK packet.

In some embodiments, the method includes permitting the source address to make a TCP connection directly with the target computer upon determining the source address to be legitimate, while permitting the source address to access the target computer only via a proxy connection as long as the legitimacy of the source address is not established.

There is additionally provided, in accordance with an embodiment of the present invention, a method for authenticating communication traffic, including:

intercepting a SYN packet directed over a network from a source address to a target computer in accordance with a Transmission Control Protocol (TCP), the SYN packet including a TCP sequence number;

in reply to the SYN packet, sending a first TCP ACK packet to the source address, while setting a TCP acknowledgment number of the first ACK packet to a first value that is not greater by one than the sequence number of the SYN packet;

receiving a TCP RST packet sent from the source address in response to the first ACK packet;

responsively to receiving the TCP RST packet, sending a second ACK packet to the source address, while setting the TCP acknowledgment, number of the second ACK packet to a second value that is greater by one than the sequence number of the SYN packet; and assessing legitimacy of the source address based upon a further response received from the source address following the further ACK packet.

Typically, assessing the legitimacy of the source address includes determining the source address to be legitimate if a further TCP RST packet is not received from the source address in response to the second ACK packet.

There is further provided, in accordance with an embodiment of the present invention, a method for authenticating communication traffic, including:

intercepting a SYN packet directed over a network from a source address to a target computer in accordance with a Transmission Control Protocol (TCP);

reading a TCP sequence number from the SYN packet;

in reply to the SYN packet, sending a TCP ACK packet to the source address, while setting a TCP acknowledgment number of the ACK packet to a value greater by one than the sequence number of the SYN packet; and upon receiving a TCP RST packet sent from the source address in response to the ACK packet, determining the source address to be illegitimate.

In a disclosed embodiment, the method includes receiving a retransmission of the SYN packet from the source address after a timeout, without having received the RST packet, and permitting the source address to make a TCP connection with the target computer responsively to the retransmission.

In another embodiment, sending the TCP ACK packet includes sending a first ACK packet, and the method further includes reading from the SYN packet a first value of a Time-To-Live (TTL) field, in reply to the SYN packet, sending a second ACK packet to the source address, while encoding the first value of the TTL field in a TCP acknowledgment number of the second ACK packet, receiving a further TCP RST packet sent from the source address in response to the second ACK packet, reading the TCP sequence number and a second value of the TTL field from the further RST packet, and comparing the TCP sequence number of the further RST packet to the second value of the TTL field in order to assess legitimacy of the source address.

In still another embodiment, intercepting the SYN packet includes intercepting a first SYN packet, and wherein sending the TCP ACK packet includes sending a first ACK packet, and the method further includes intercepting a second SYN packet from the source address, subsequent to the first SYN packet, reading from the second SYN packet a first value of a Time-To-Live (TTL) field, in reply to the second SYN packet, sending a second ACK packet to the source address, while encoding the first value of the TTL field in a TCP acknowledgment number of the second ACK packet, receiving a further TCP RST packet sent from the source address in response to the second ACK packet, reading the TCP sequence number and a second value of the TTL field from the further RST packet, and comparing the TCP sequence number of the further RST packet to the second value of the TTL field in order to assess legitimacy of the source address. Typically, intercepting the second SYN packet includes receiving a retransmission of the first SYN packet from the source address, without having received the RST packet.

Typically the method includes permitting the source address to make a TCP connection directly with the target computer upon determining the source address to be legitimate, while permitting the source address to access the target computer only via a proxy connection as long as the legitimacy of the source address is not established.

There if moreover provided, in accordance with an embodiment of the present invention, apparatus for authenticating communication traffic, including a guard device, which is coupled to intercept a request directed over a network from a source address to open a connection to a target computer in accordance with a handshake procedure specified by a predetermined communication protocol, and is adapted to send to the source address a reply to the request that deviates from the specified handshake procedure, to analyze a response from the source address to the reply in order to make an assessment of legitimacy of the source address, and upon determining, based on the assessment, that the source address is legitimate, to permit the target computer to complete the handshake procedure so as to open the connection with the source address.

There is furthermore provided, in accordance with an embodiment of the present invention, apparatus for authenticating communication traffic, including a guard device, which is coupled to intercept a SYN packet directed over a network from a source address to a target computer in accordance with a Transmission Control Protocol (TCP), and is adapted to read from the SYN packet a first value of a Time-To-Live (TTL) field, and in reply to the SYN packet, to send a TCP ACK packet to the source address, while encoding the first value of the TTL field in a TCP acknowledgment number of the ACK packet, wherein the guard device is coupled to receive a TCP RST packet sent from the source address in response to the ACK packet, and is adapted to read a TCP sequence number and a second value of the TTL field from the RST packet, and to compare the TCP sequence number to the second value of the TTL field in order to assess legitimacy of the source address.

There is also provided, in accordance with an embodiment of the present invention, apparatus for authenticating communication traffic, including a guard device, which is coupled to intercept a SYN packet directed over a network from a source address to a target computer in accordance with a Transmission Control Protocol (TCP), the SYN packet including a TCP sequence number, and which is adapted to send, in reply to the SYN packet, a first TCP ACK packet to the source address, while setting a TCP acknowledgment number of the first ACK packet to a first value that is not greater by one than the sequence number of the SYN packet, and which is further adapted, upon receiving a TCP RST packet sent from the source address in response to the first ACK packet, to send a second ACK packet to the source address, while setting the TCP acknowledgment number of the second ACK packet to a second value that is greater by one than the sequence number of the SYN packet, and to assess legitimacy of the source address based upon a further response received from the source address following the further ACK packet.

There is additionally provided, in accordance with an embodiment of the present invention, apparatus for authenticating communication traffic, including a guard device, which is coupled to intercept a SYN packet directed over a network from a source address to a target computer in accordance with a Transmission Control Protocol (TCP), and which is adapted to read a TCP sequence number from the SYN packet, and in reply to the SYN packet, to send a TCP ACK packet to the source address, while setting a TCP acknowledgment number of the ACK packet to a value greater by one than the sequence number of the SYN packet, and to determine the source address to be illegitimate upon receiving a TCP RST packet sent from the source address in response to the ACK packet.

There is further provided, in accordance with an embodiment of the present invention, a computer software product for authenticating communication traffic, the product including a computer readable medium, in which program instructions are stored, which instructions, when read by a guard computer, cause the guard computer to intercept a request directed over a network from a source address to open a connection to a target computer in accordance with a handshake procedure specified by a predetermined communication protocol, and further cause the guard computer to send to the source address a reply to the request that deviates from the specified handshake procedure, to analyze a response from the source address to the reply in order to make an assessment of legitimacy of the source address, and upon determining, based on the assessment, that the source address is legitimate, to permit the target computer to complete the handshake procedure so as to open the connection with the source address.

There is moreover provided, in accordance with an embodiment of the present invention, a computer software product for authenticating communication traffic, the product including a computer readable medium, in which program instructions are stored, which instructions, when read by a guard computer, cause the guard computer to intercept a SYN packet directed over a network from a source address to a target computer in accordance with a Transmission Control Protocol (TCP), and to read from the SYN packet a first value of a Time-To-Live (TTL) field, and in reply to the SYN packet, to send a TCP ACK packet to the source address, while encoding the first value of the TTL field in a TCP acknowledgment number of the ACK packet, wherein the instructions further cause the guard computer to receive a TCP RST packet sent from the source address in response to the ACK packet, and to read a TCP sequence number and a second value of the TTL field from the RST packet, and to compare the TCP sequence number to the second value of the TTL field in order to assess legitimacy of the source address.

There is furthermore provided, in accordance with an embodiment of the present invention, a computer software product for authenticating communication traffic, the product including a computer readable medium, in which program instructions are stored, which instructions, when read by a guard computer, cause the guard computer to intercept a SYN packet directed over a network from a source address to a target computer in accordance with a Transmission Control Protocol (TCP), the SYN packet including a TCP sequence number, and further cause the guard computer to send, in reply to the SYN packet, a first TCP ACK packet to the source address, while setting a TCP acknowledgment number of the first ACK packet to a first value that is not greater by one than the sequence number of the SYN packet, and which instructions further cause the guard computer, upon receiving a TCP RST packet sent from the source address in response to the first ACK packet, to send a second ACK packet to the source address, while setting the TCP acknowledgment number of the second ACK packet to a second value that is greater by one than the sequence number of the SYN packet, and to assess legitimacy of the source address based upon a further response received from the source address following the further ACK packet.

There is also provided, in accordance with an embodiment of the present invention, a computer software product for authenticating communication traffic, the product including a computer readable medium, in which program instructions are stored, which instructions, when read by a guard computer, cause the guard computer to intercept a SYN packet directed over a network from a source address to a target computer in accordance with a Transmission Control Protocol (TCP), and further cause the guard computer to read a TCP sequence number from the SYN packet, and in reply to the SYN packet, to send a TCP ACK packet to the source address, while setting a TCP acknowledgment number of the ACK packet to a value greater by one than the sequence number of the SYN packet, and to determine the source address to be illegitimate upon receiving a TCP RST packet sent from the source address in response to the ACK packet.

The present invention will be more fully understood from the following detailed description of the embodiments thereof, taken together with the drawings in which:

DETAILED DESCRIPTION OF EMBODIMENTS

Figure 1:
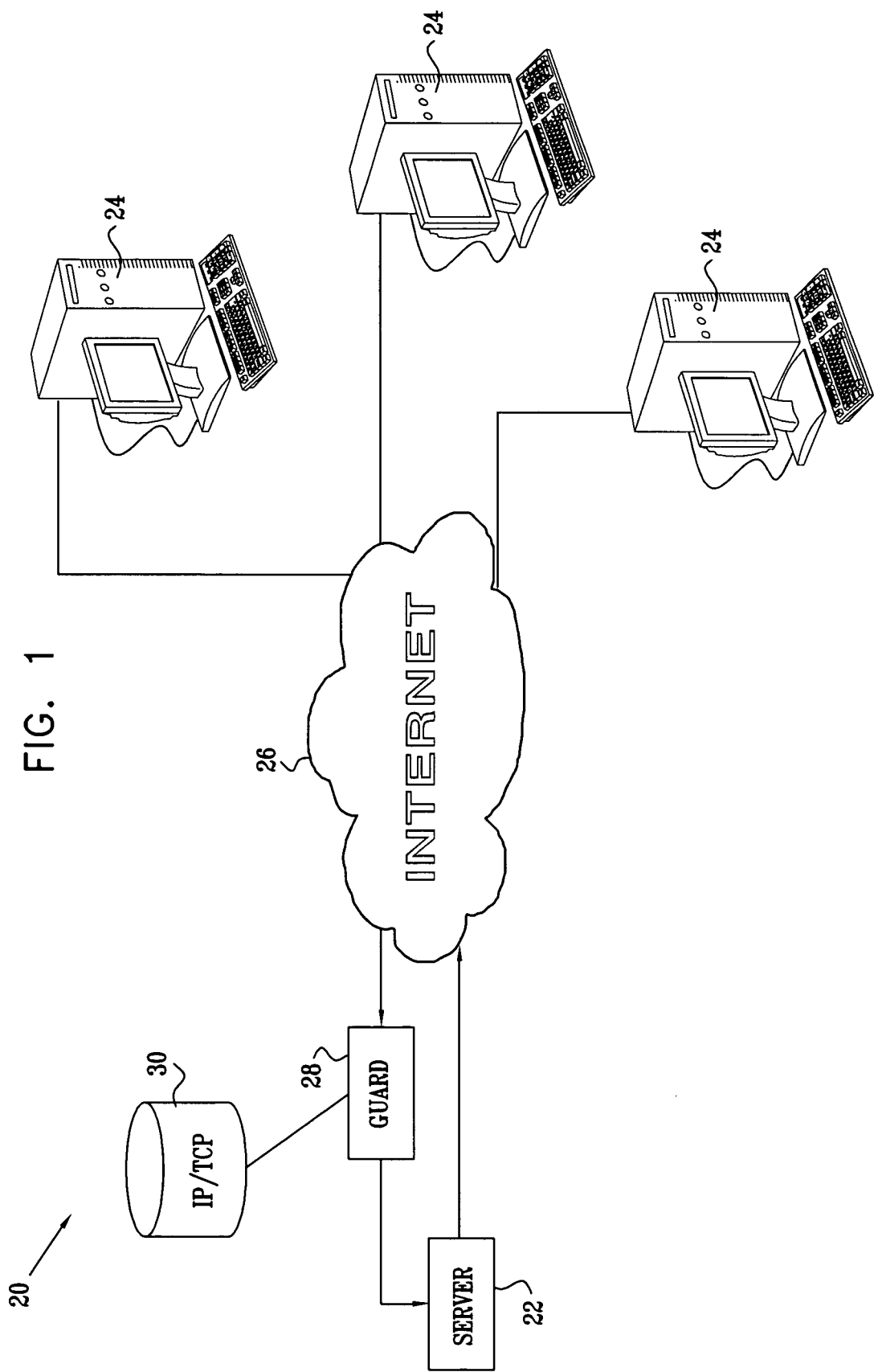
FIG. 1 is a block diagram that schematically illustrates a system for computer communications, in accordance with an embodiment of the present invention.

FIG. 1 is a block diagram that schematically illustrates a computer network system 20, in accordance with an embodiment of the present invention. A server 22 communicates with remote client computers 24 via a wide-area network (WAN) 26, typically the Internet. To prevent DDoS attacks on server 22, a guard device 28 intercepts incoming TCP/IP packets from network 26 that are addressed to server 22. The guard device checks each packet that it intercepts against information stored in a database 30 or other data structure. This information may comprise, for example, a listing of IP source addresses on network 26 that are known to be legitimate. Alternatively or additionally, database 30 may hold a "black-list" of suspect IP source addresses. Further alternatively or additionally, the information in database 30 may comprise a listing of legitimate TCP connections from computers to server 22 that have already been opened. Methods for generating the information in database 30—indicating which connection requests are legitimate, and which may have originated from spoofed IP addresses—are described further hereinbelow. Note that these methods require guard device 28 to monitor and intercept only incoming traffic, while outgoing traffic from server 22 to network 26 is generally allowed to flow freely.

Guard device 28 blocks illegitimate requests from passing through to server 22, while permitting computers 24 that have been authenticated as legitimate to open direct TCP connections to server 22. Once the remote computer has opened a TCP connection with the server, the guard device permits the connection to continue without further intervention until the connection is closed. Typically, upon authenticating a source IP address, the guard device creates an entry in database 30 that persists for a certain amount of time, so that subsequent connection requests from the same IP address (up to the expiration time of the database entry) do not need to be re-authenticated. Alternatively, the authentication may apply only to a single TCP connection, and the guard device therefore authenticates every connection request that comes in from network 26. The number of new IP addresses or connections that are authenticated during any given period of time may be limited, so as to avoid overloading server 22 even when attackers are successful in overcoming the defense mechanisms described herein. The methods of source address authentication that are described hereinbelow may be used in conjunction with other methods known in the art, such as those described in the above-mentioned related applications.

In cases of doubt, guard device 28 may be configured to serve as a TCP proxy between computer 24 and server 22. In proxy mode, computer 24 is permitted to open a TCP connection to guard device 28, while the guard device opens a second, back-to-back TCP connection with server 22. All TCP communications between computer 24 and server 22 then relayed through the guard device. Because of the high overhead involved in TCP proxy operation, however, guard device 28 generally exits from this operating mode as soon as it has verified that computer 24 is legitimate. The remote computer may demonstrate its legitimacy simply by being able to open and maintain a TCP connection with the guard device. Alternatively or additionally, guard device 28 may apply features of higher-level protocols, such as the Hypertext Transfer Protocol (HTTP), in order to authenticate the remote computer. Authentication techniques of this sort are described, for example, in the above-mentioned U.S. provisional patent application entitled "Upper-Level Protocol Authentication."

Guard device 28 may use various methods to terminate TCP proxy operation and cause the authenticated remote computer 24 to continue communication directly with server 22. One method is for the guard device simply to send a RST packet to close the TCP connection after it has been established and the source IP address has been authenticated. When the client application on computer 24 then attempts to reconnect, the guard device will recognize the source IP address as legitimate, and will permit the remote computer to connect directly to server 22. Alternatively, when server 22 is a Web server, guard device 28 may use HTTP to instruct the client agent on computer 24 to open a new TCP connection. For example, the guard device may reply to a HTTP request from computer 24 with a HTTP 302 error code, or with a Hypertext Markup Language (HTML) answer containing a "refresh" command. In these cases, as well, when the client agent on computer 24 attempts to open the new TCP connection, the guard device will recognize the legitimate source IP address and will permit a direct connection to be made to server 22.

Guard device 28 typically comprises a general-purpose computer, which is programmed in software to carry out the functions described herein. This software may be supplied to the guard device computer in electronic form, over a network, for example, or it may alternatively be provided on tangible media, such as CD-ROM, DVD, magnetic media or non-volatile memory. Alternatively or additionally, some or all of the functions of the guard device may be implemented using dedicated or semi-custom hardware circuits.

The configuration and operation of guard device 28 are shown and described herein by way of example, and alternative configurations and modes of operation will be apparent to those skilled in the art. For example, rather than being connected in-line with server 22, as shown in FIG. 1, guard device 28 may be connected in other configurations, for example, by a "lollipop" connection to a router (not shown) that forwards packets to server 22. Alternatively, functions of the guard device may be integrated into the router or server or into other network equipment, such as a firewall. These and other possible operational configurations of the guard device are described in the above-mentioned related applications. Although guard device 28 is shown and described herein as protecting a single server 22, in practice one or more guard devices of this sort may be deployed to protect a group of computers, such as a cluster of servers or an entire LAN. Additional deployment scenarios for the guard device(s) are likewise described in the above-mentioned related applications.

Figure 2:
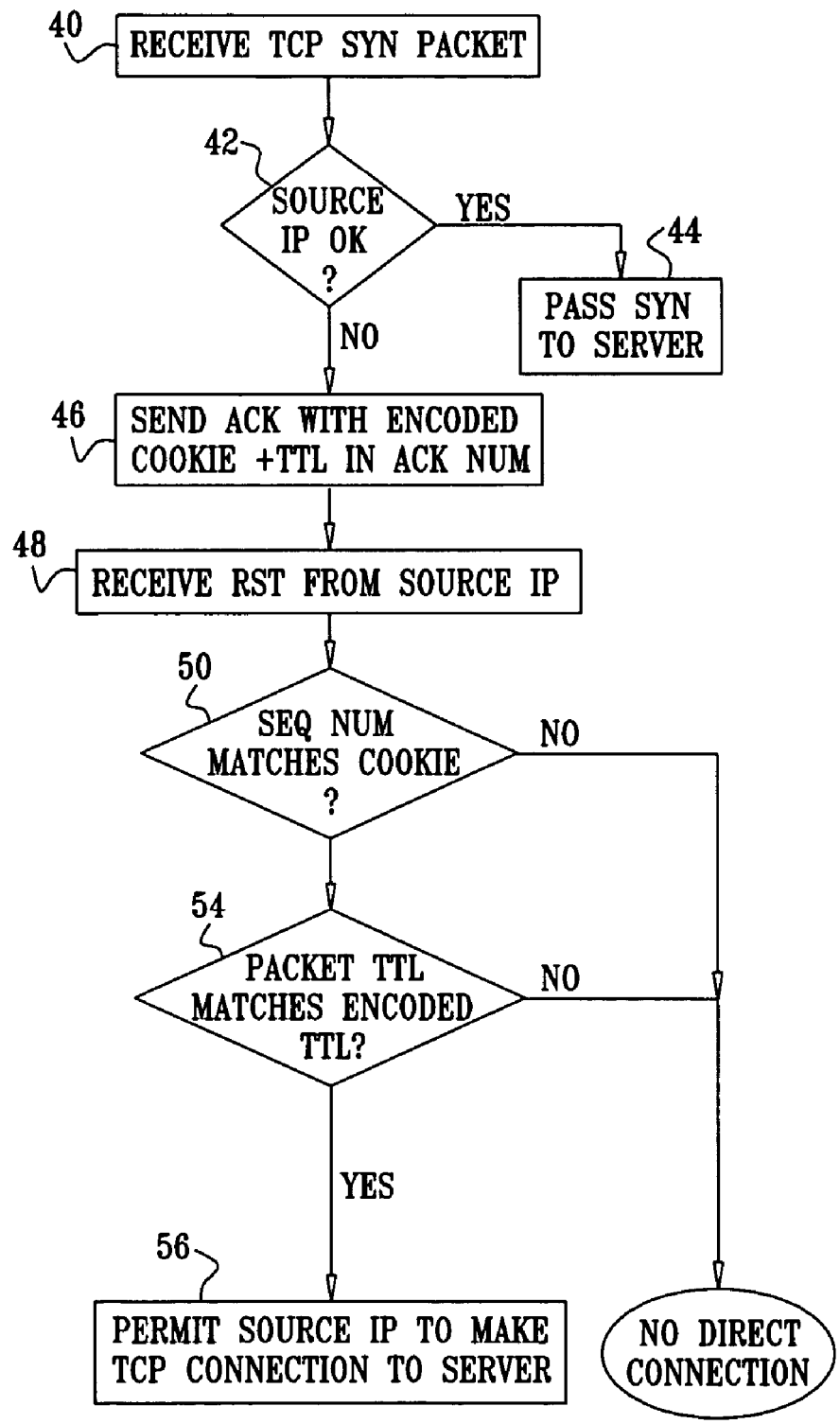
FIGS. 2-7 are flow charts that schematically illustrate methods for authenticating TCP connection requests, in accordance with embodiments of the present invention.

FIG. 2 is a flow chart that schematically illustrates a method for authenticating a TCP connection request, in accordance with an embodiment of the present invention. The method is initiated by guard device 28 upon receiving a TCP SYN packet directed to the destination IP address of server 22 from network 26, at a SYN reception step 40. The guard device checks the source IP address of the packet against the listings in database 30, at a source address checking step 42. (Alternatively, if the guard device is configured to authenticate every new TCP connection, irrespective of the source address, step 42 is skipped.) If the source IP address appears in database 30 as legitimate, guard device 28 simply passes the SYN packet along to server 22, at a pass-through step 44. Alternatively, if the source IP address has already been identified as illegitimate, and thus appears on the blacklist in database 30, the guard device may simply discard the packet without further processing.

In reply to the SYN packet received at step 40, guard device 28 returns a TCP ACK packet to the source IP address of the SYN packet, at an incorrect acknowledgment step 46. As noted in the Background section, the expected TCP handshake response at this point is SYN-ACK, rather than simply ACK. Furthermore, a correct ACK packet, according to TCP, would contain the acknowledgment number ISN+1, wherein ISN is the Initial Sequence Number carried by the SYN packet. At step 46, however, the guard device intentionally inserts a different, incorrect acknowledgment number in the ACK packet. The guard device inserts an acknowledgment number in the ACK packet that will serve as a cookie, for the purpose of checking the next response received from the source IP address, as described below. The guard device may store the cookie value in memory, for subsequent reference or, alternatively, it may derive the cookie from certain header parameters of the SYN packet, using a hash function, for example, so that storage of the actual cookie value is not required.

Typically, guard device 28 encodes information gleaned from the SYN packet in the cookie. The encoded information may include, for example, the value of the Time-To-Live (TTL) field from the IP header of the SYN packet. The TTL field is supposed to indicate the number of hops that a packet has traversed through the network since leaving its source. Successive packets sent legitimately from the same computer 24, with the same source and destination addresses, should arrive at guard device 28 with approximately the same TTL value (to within a tolerance that may be allowed for network instabilities). Deviations in the TTL values may be indicative that the IP source address is spoofed. The use of TTL tracking in detecting spoofed traffic is described further in the above-mentioned U.S. patent application Ser. No. 10/232,993. As described in that application, the guard device may alternatively store the TTL value of the SYN packet in database 30, rather than encoding the TTL value in the ACK packet sent at step 46. Encoding the TTL value in the ACK cookie, however, as described herein, is generally a more memory-efficient approach.

Upon receiving the ACK packet with the incorrect acknowledgment number, the computer at the source IP address will respond, in accordance with TCP convention, by sending a RST packet. The sequence number of the RST packet should be equal to the acknowledgment number of the incorrect ACK packet sent by guard device 28 at step 46. Of course, if the source IP address of the original SYN packet was spoofed and is not assigned to any real computer, no RST will be sent. On the other hand, some firewalls that are currently in use block ACK packets, and may thus prevent a legitimate remote computer 24 behind the firewall from receiving the ACK packet sent at step 46. In this case, the remote computer will resend its SYN packet after timeout, without ever having sent a RST response. Alternative methods for authentication that deal with this sort of eventuality are described below.

Assuming computer 24 at the source IP address of the SYN packet does respond with a RST packet as expected, guard device 28 receives and analyzes the RST packet at a reset reception step 48. The guard device checks the TCP sequence number of the RST packet against the cookie value that was encoded in the ACK packet, at a cookie matching step 50. If the sequence number does not match the cookie, the guard device classifies the source IP address of the RST packet as possibly illegitimate. In addition, the guard device checks the TTL value appearing in the RST packet IP header against the earlier TTL value (taken from the SYN packet) that is encoded in the current TCP sequence number, at a TTL checking step 54. Alternatively, the guard device may check the TTL value of the RST packet against an earlier TTL value that was stored in database 30, as noted above. Again, if the TTL values do not match to within a predefined tolerance, the source IP address may be illegitimate. As long as guard device 28 has not authenticated the source IP address as legitimate, the guard device does not permit computer 24 to establish a direct connection with server 22. The guard device may, however, establish a proxy connection with the source IP address, as described further hereinbelow.

On the other hand, when the sequence number and TTL value of the RST packet pass the tests of steps 50 and 54, guard device 28 permits computer 24 at the source IP address to make a TCP connection directly to server 22, at a connection step 56. For this purpose, for example, the guard device may simply not respond to the RST packet received at step 48. In this case, after a certain timeout period, computer 24 will retransmit the original SYN packet. Since the guard device has now authenticated the TCP connection and/or source IP address, it will recognize the SYN packet as legitimate at step 42, and will thus permit the three-way handshake to proceed directly between computer 24 and server 22. Alternatively, upon reception of the RST packet and successful completion of steps 50 and 54, guard device 28 may forward the original SYN packet, as received at step 40, to server 22, and may thus avoid the delay due to the timeout period.

Figure 3:
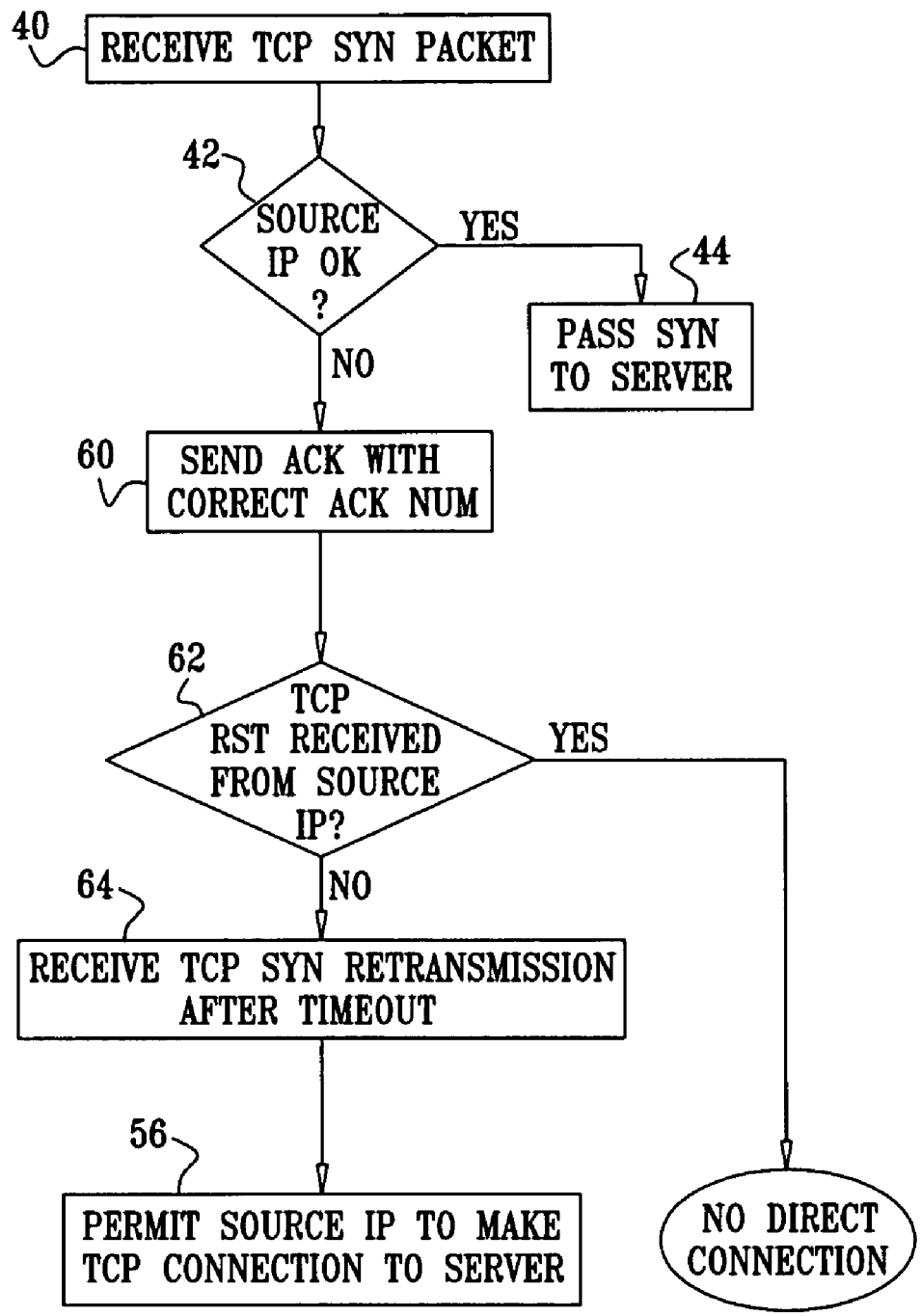

FIG. 3 is a flow chart that schematically illustrates a method for authenticating a TCP connection request, in accordance with another embodiment of the present invention. Like the method of FIG. 2, the method of FIG. 3 (and of the other methods described below) is initiated when guard device 28 receives a TCP SYN packet at step 40. The guard device carries out steps 42 and 44 as described above. In this case, however, if the source IP address of the SYN packet has not been previously authenticated, the guard device replies to the SYN packet by sending an ACK packet containing the correct acknowledgment number, at a correct acknowledgment step 60. In other words, the ACK packet sent at step 60 contains the acknowledgment number ISN+1, wherein ISN is the Initial Sequence Number specified in the SYN packet. Although the ACK packet in this case is "correct" (as opposed to the incorrect ACK packet sent in the method of FIG. 2), the guard device does not set the SYN bit in the packet, as would be expected in a conventional TCP handshake.

According to RFC 793, upon receiving a correct ACK packet at this point, in which the SYN control bit is not set, computer 24 makes no response, but simply remains in the SYN-SENT state. After timeout, computer 24 will retransmit its SYN packet. On the other hand, if computer 24 was not the actual source of the original SYN packet (as will be the case if the source IP address of the SYN packet was spoofed), computer 24 will consider the ACK packet to be incorrect, and will respond by sending a RST packet back to the source address of the ACK packet. If guard device 28 receives such a RST packet, at a reset reception step 62, the guard device classifies the source IP address of the RST packet as possibly illegitimate, and does not permit a direct TCP connection to be established between this source address and server 22.

If guard device 28 receives no RST packet at step 62, the guard device will subsequently receive the retransmitted SYN packet from computer 24, at a repeat reception step 64. In this case, the guard device may permit the SYN packet to pass through to server 22, and the connection between computer 24 and server 22 is established normally at step 56. Note, however, that if the source IP address of the SYN packet is not assigned to any computer (as may be the case with some packets sent during a DDoS attack), the guard device will also receive no RST reply at step 62, and may therefore erroneously classify the source IP address as legitimate. For this reason, the method of FIG. 3 is typically used in conjunction with other methods of TCP-based authentication in order to distinguish between legitimate and non-existent IP addresses. Some combined methods of this sort are described hereinbelow. Alternatively or additionally, the method of FIG. 3 may be combined with packet filtering and/or with other methods described in the above-mentioned related patent applications.

Figure 4:
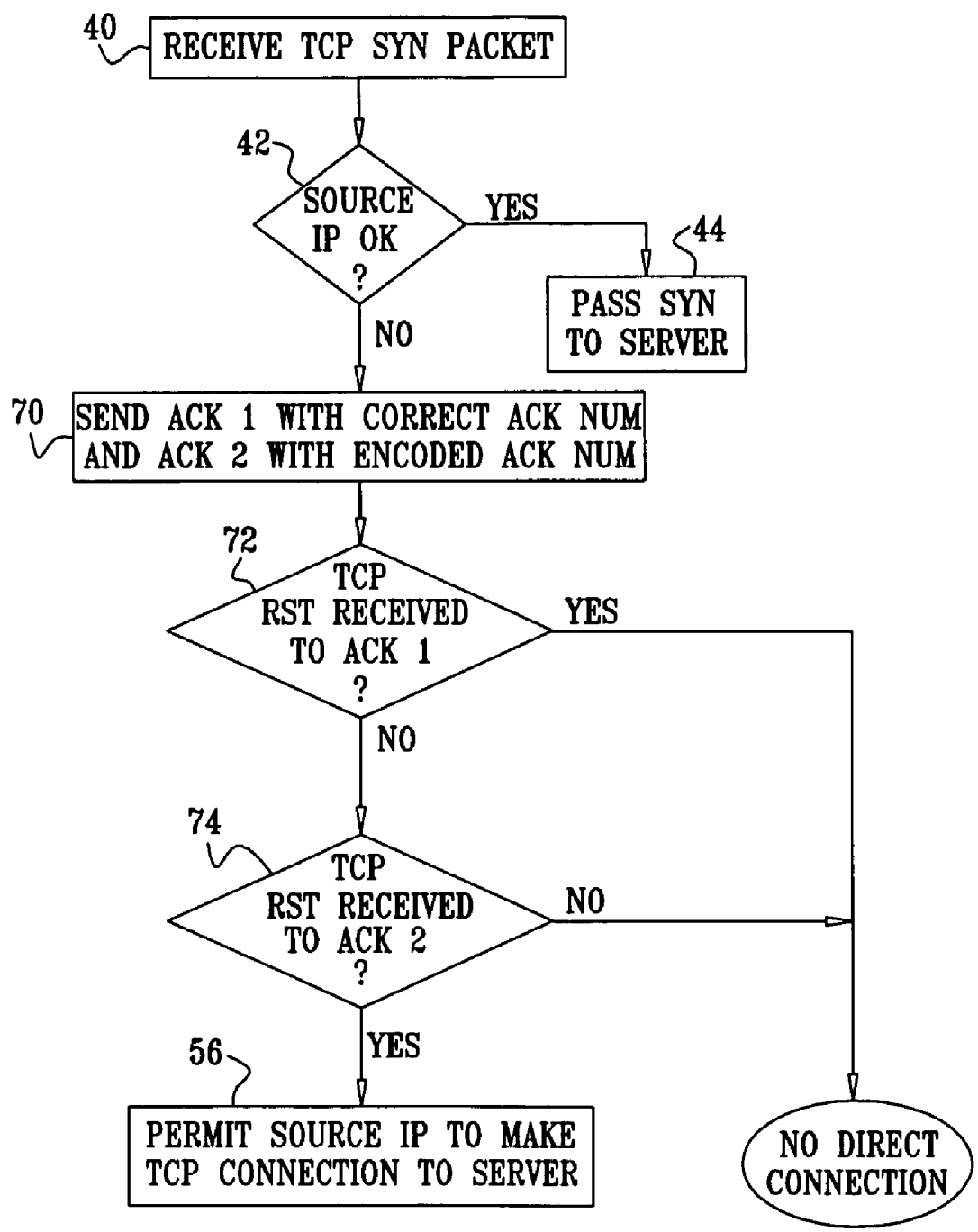

FIG. 4 is a flow chart that schematically illustrates a method for authenticating a TCP connection request, in accordance with yet another embodiment of the present invention. In this case, after receiving a SYN packet at step 40, and performing steps 42 and 44 as appropriate, guard device 28 sends two ACK packets to the source IP address of the SYN packet, at a dual acknowledgment step 70. The first ACK packet (ACK1) has the correct acknowledgment number (as at step 60, in FIG. 3). The second ACK packet (ACK2) has an "incorrect," encoded acknowledgment number, containing a cookie, and possibly (although not necessarily) containing the TTL value, as at step 46, in FIG. 2. It is assumed for the purposes of this method that packet delivery over network 26 is sufficiently reliable so that none of the packets involved in the method are lost, and so that ACK1 is received at the source IP address of the SYN packet before ACK2. To the extent that these assumptions are violated, guard device 28 may occasionally permit an illegitimate source IP address to open a connection to server 22, or may disqualify a legitimate source IP address.

Guard device 28 waits to receive a RST packet in response to the first (correct) ACK packet, at an ACK1 reset reception step 72. As explained above in reference to FIG. 3, if the guard device receives a RST in response to the correct ACK packet, it is an indication that the source IP address is illegitimate, and the guard device accordingly prevents the establishment of a direct connection between the source IP address and server 22. On the other hand, if the source IP address is legitimate, computer 24 at this address will ignore the first ACK packet, and will then send a RST packet in response to the second (encoded) ACK packet. The RST packets may be distinguished by their acknowledgment numbers. Guard device 28 waits to receive this latter RST packet, at an ACK2 reset reception step 74. The guard device may optionally check the cookie carried in the sequence number field of the RST packet, as at steps 50 and 54 (FIG. 2). In the present embodiment, however, this additional checking is not strictly needed, since the very fact that the source IP address ignored ACK1 and then responded with a RST to ACK2 is indicative of the existence of a legitimate computer with a properly-functioning TCP stack at the source IP address. Upon successfully passing step 74, the guard device permits a normal connection to be established between computer 24 and server 22, at step 56, as described above.

The method of FIG. 4 thus combines the methods of FIGS. 2 and 3 in order to provide more reliable authentication. It has the disadvantage of "bandwidth amplification," i.e., guard device 28 sends two ACK packets in response to every SYN packet that it receives from an unrecognized source IP address. Furthermore, if computer 24 is located behind a firewall that does not pass the ACK packets sent at step 70, the computer will not respond with a RST packet to either of the ACK packets, but will rather retransmit the original SYN packet.

Figure 5:
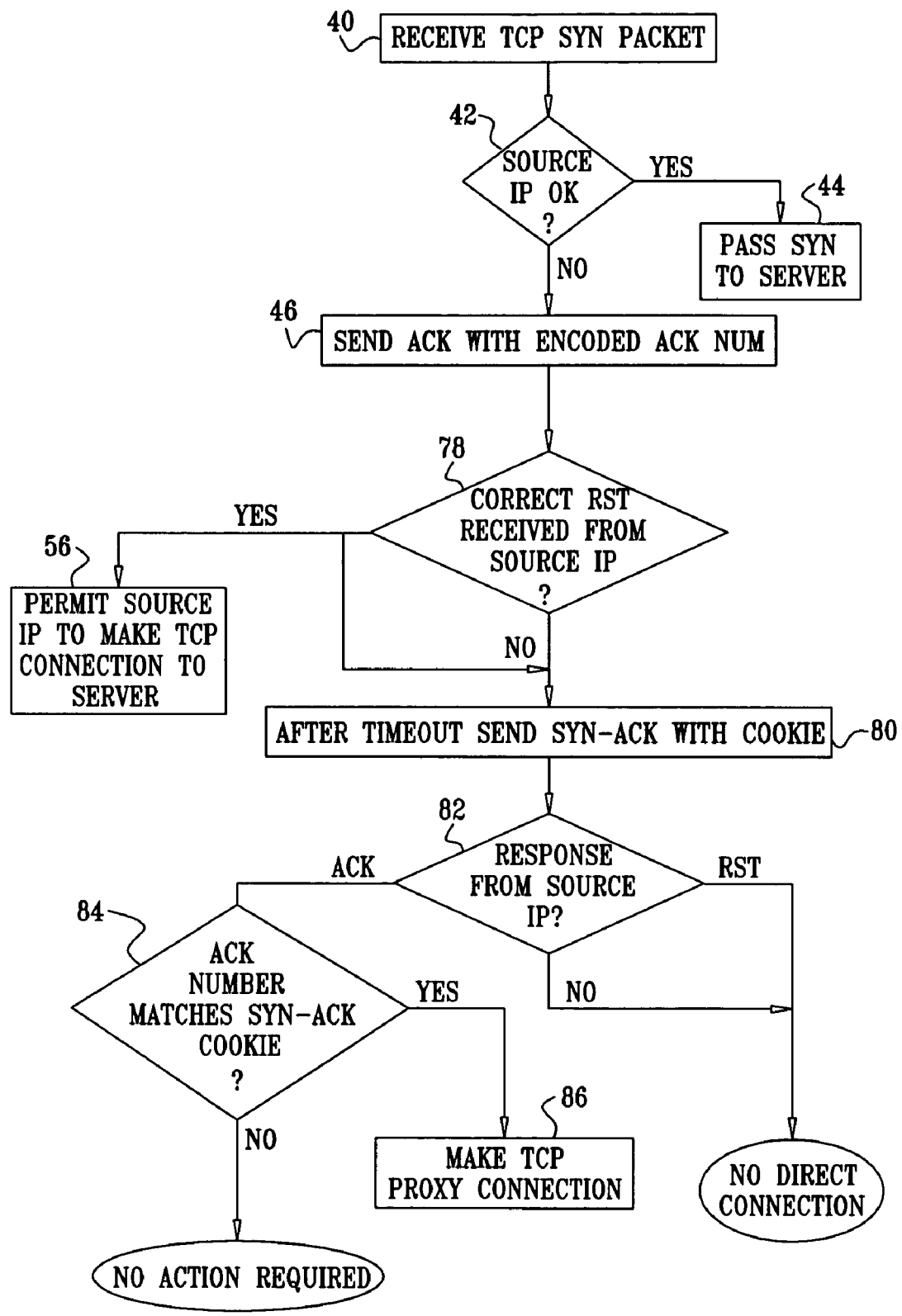

FIG. 5 is a flow chart that schematically illustrates a method for authenticating a TCP connection request, in accordance with still another embodiment of the present invention. This method is based on the method of FIG. 2 (steps 40-46), but adds the possibility of TCP proxy support for computers 24 that are unable to receive and respond to ACK packets sent by guard device 28. Thus, as in the method of FIG. 2, guard device 28 sends an ACK packet with an encoded acknowledgment number at step 46, and then waits to receive a RST packet in response, at a reset reception step 78. If the guard device receives a RST packet and determines that the RST packet contains the proper sequence number and TTL value (according to the criteria of steps 50 and 54 in FIG. 2), it permits computer 24 at the source IP address to establish a connection directly with server 22 at step 56.

After sending the ACK packet at step 46, guard device 28 waits for a certain period of time, for example, 4 sec. This period is typically chosen to be substantially longer than the SYN retransmission timeout period plus the estimated round-trip transmission time between guard device 28 and computer 24. The guard device then sends a correct TCP SYN-ACK packet to the source IP address of the original SYN packet, at a SYN-ACK step 80. The ISN of the SYN-ACK packet contains a cookie, so as to enable guard device to recognize a legitimate response to the SYN-ACK packet that may be sent by computer 24. Step 80 may be performed irrespective of whether the guard device receives a RST packet at step 78.

During the waiting period before step 80, if the source IP address was authenticated at step 78, guard device 28 will have permitted computer 24 to establish a direct connection with server 22 at step 56. In the course of establishing this connection, server 22 will have sent a SYN-ACK packet, giving its own ISN, and computer 24 will have responded with an ACK packet to complete the three-way handshake, specify its receive window, and thus open the connection. When computer 24 subsequently receives the SYN-ACK packet sent by guard device 28 at step 80, the computer will in all likelihood find the ISN specified by this SYN-ACK packet to be outside the receive window it has set. In this case, computer 24 will return an ACK packet in response to the superfluous SYN-ACK sent by the guard device. This ACK packet will indicate the correct next sequence number expected on the TCP connection already established with server 22, and thus will have no effect on this connection.

On the other hand, if computer 24 has not yet established a connection with server 22 (because it did not receive the ACK packet sent at step 46 and therefore did not return a RST packet at step 78, for example), the computer will see the SYN-ACK packet sent at step 80 as a proper TCP reply to the SYN packet sent by the computer. In this case, too, computer 24 will return an ACK packet in response to the SYN-ACK packet, but the acknowledgment number of the ACK packet will contain the cookie inserted by guard device 28 in the SYN-ACK packet sent at step 80. If the source IP address of the SYN packet was spoofed, however, computer 24 will consider the SYN-ACK packet to be incorrect, and will return a RST packet in response. Alternatively, if the source IP address was spoofed and is not assigned to any computer, there will be no response at all to the SYN-ACK packet.

Therefore, at a SYN-ACK response step 82, guard device 28 evaluates the response from computer 24 to the SYN-ACK packet sent by the guard device at step 80. If computer 24 responds to the SYN-ACK packet with a RST packet or makes no response, the guard device treats the source IP address of the SYN packet as possibly illegitimate, and does not permit the source IP address to make a direct connection with server 22. Alternatively, upon receiving an ACK packet at step 82, the guard device checks the acknowledgment number of the ACK packet against the cookie inserted at step 80 in the SYN-ACK packet, at a cookie checking step 84. If the acknowledgment number does not match the cookie (as will be the case if a direct connection between computer 24 and server 22 has already been made at step 56, following successful authentication at step 78), the guard device discards the ACK packet and takes no further action. If the acknowledgment number matches the cookie, however, the guard device opens a TCP proxy connection to the source IP address, at a proxy connection step 86. Computer 24 is then permitted to communicate with server 22 via the proxy connection, as described above.

The method of FIG. 5 thus has the advantage that all legitimate computers 24 are permitted to make TCP connections to server 22, either directly or by proxy. It has the disadvantages of possible bandwidth amplification (due to transmission of both ACK and SYN-ACK replies), and of burdening guard device 28 with the overhead of proxy operation. For this reason, the guard device may close its proxy connections a short time after they are opened, and induce the computers involved in these proxy connections to connect directly to server 22, as described earlier.

Figure 6:
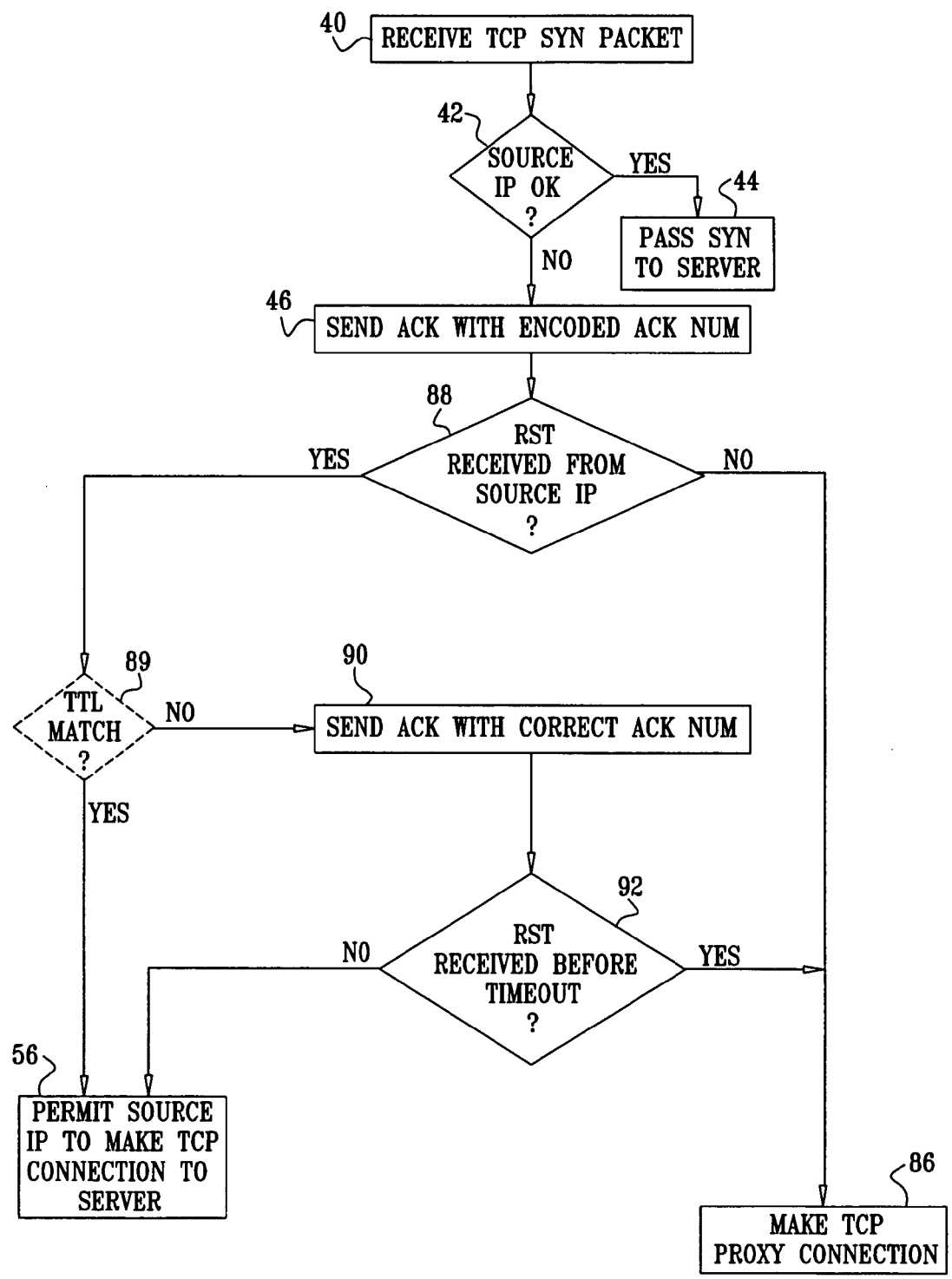

FIG. 6 is a flow chart that schematically illustrates a method for authenticating a TCP connection request, in accordance with a further embodiment of the present invention. This method begins similarly to the method shown in FIG. 5, up to and including step 46, in which guard device 28 sends an ACK packet with an "incorrect" acknowledgment number to the source IP address of the SYN packet received at step 40. The acknowledgment number may contain a cookie, and may encode the TTL value of the SYN packet. Alternatively, the ACK packet may contain an arbitrary incorrect acknowledgment number.

Guard device 28 waits to receive a RST packet from the source IP address, at a first RST reception step 88. If no RST packet is received at all (as may occur, for example, if the ACK packet sent at step 46 was blocked by a firewall), the guard device does not permit a direct connection to be established between the source IP address and server 22. Instead, the guard device may permit the source IP address to communicate with the server via a TCP proxy connection, as described above, at step 86.

If guard device 28 receives a RST packet at step 88, it may optionally check the sequence number and TTL value of the RST packet against the cookie created at step 46, at a sequence checking step 89. At this step, guard device 28 determines whether the RST packet contains the proper sequence number and TTL value, as at steps 50 and 54 in the method of FIG. 2. If so, the guard device permits computer 24 to establish a connection directly with server 22 at step 56, as described above.

If guard device 28 receives a RST packet with a TTL value that does not match the value encoded in the cookie, as determined at step 89, the guard device sends a second ACK packet to the source IP address of the SYN packet received at step 40, at a correct ACK sending step 90. Alternatively, step 89 may be omitted, in which case the guard device proceeds directly to step 90 whenever it receives a RST packet at step 88. The ACK packet sent at step 90 has the correct acknowledgment number: ISN+1, as in step 60 (FIG. 3).

Guard device 28 waits to receive another RST packet in response to the second ACK packet, at a second RST reception step 92. The guard device waits for a certain timeout period, which is typically set to be greater than the estimate round-trip transit time that it takes to exchange packets between guard device 28 and computer 24. (The round trip transit time is typically less than 1 sec, and may be measured for each source IP address based on the first ACK/RST exchange at steps 46 and 88.) If no RST packet is received within this timeout period, the guard device determines that the source IP address of the original SYN packet is legitimate, as in the method of FIG. 3 (but with the added security provided by having received a RST packet at step 88). In this case, the guard device permits computer 24 to connect directly to server 22 at step 56, as described above. If the guard device receives a RST packet at step 92, however, it does not authenticate the source IP address. Instead, the guard device may open a TCP proxy connection to the source IP address, at proxy connection step 86, as described above.

Figure 7:
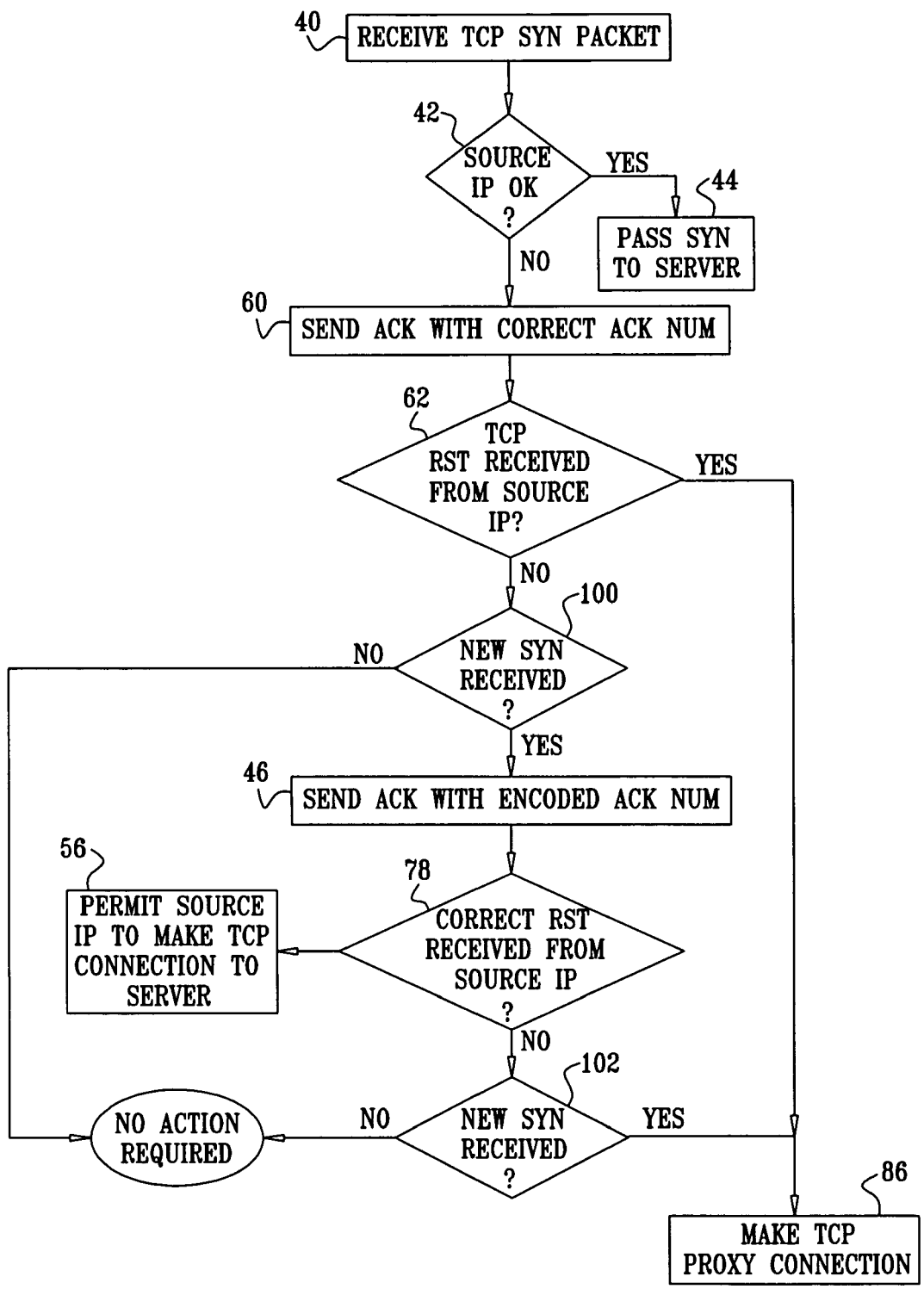

FIG. 7 is a flow chart that schematically illustrates a method for authenticating a TCP connection request, in accordance one more embodiment of the present invention. This method is based on the method of FIG. 3, up to step 62. At this step, if guard device 28 receives a RST packet in response from the source IP address of the SYN packet that was received at step 40, the guard device may open a TCP proxy connection to computer 24 at step 86, as described above.

If no RST packet is received at step 62, guard device 28 waits to receive a retransmitted SYN packet from the source IP address, at a second SYN reception step 100. If no repeat SYN packet is received, the guard device need take no further action. When the retransmitted SYN packet is received, however, the guard device initiates the method of FIG. 2, by sending another ACK packet, this time with an encoded acknowledgment number, at step 46. The guard device then waits to receive the expected RST packet from the source IP address in response to the ACK packet, and analyzes the sequence number and TTL value of the RST packet at step 78. The analysis proceeds as described above in reference to FIG. 2 (steps 50 and 54). Upon successful authentication at step 78, computer 24 is permitted to connect directly to server 22 at step 56. As in the method of FIG. 4, the method of FIG. 7 assumes that packet delivery over network 26 is sufficiently reliable so that the packets arrive at their destinations in the original order in which they were sent. To the extent that this assumption is violated, guard device 28 may occasionally permit an illegitimate source IP address to open a connection to server 22, or may disqualify a legitimate source IP address.

Alternatively, if guard device 28 does not receive the correct RST packet at step 78, it waits to receive a further retransmitted SYN packet, at a third SYN reception step 102. In response to the third SYN, the guard device opens a TCP proxy connection to computer 24 at step 86. Otherwise, if the third SYN packet is not received, the guard device need take no further action.

The methods of FIGS. 6 and 7 have the advantage of high reliability, without the drawback of bandwidth amplification. Both of these methods require guard device 28 to maintain a data structure that is large enough to track the state of the authentication process for each source IP address that has sent a SYN packet but has not yet been either authenticated or disqualified. Access to the data structure should be made fast enough so that the guard device does not become a traffic bottleneck. Suitable methods for constructing and accessing such data structures are known in the art. For example, a hash table may be used for this purpose.

Although the methods described above refer specifically to features of TCP, the principles of the present invention may similarly be applied to authenticate connection requests using other connection-oriented protocols. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for authenticating an Internet Protocol (IP) source address in a Transmission Control Protocol (TCP) communication directed over a network to a target computer, the method comprising:
intercepting a SYN request packet from the IP source address to open a connection to the target computer in accordance with a TCP three-way handshake procedure;
sending to the IP source address a reply to the intercepted SYN request packet that deviates from the three-way TCP handshake procedure by sending a TCP ACK packet as a reply to the intercepted SYN request packet instead of a SYN ACK packet when opening a new TCP connection;

analyzing a response from the IP source address to the TCP ACK reply in order to make an assessment of legitimacy of the IP source address; and upon determining, based on the assessment, that the IP source address is legitimate, permitting the target computer to complete the handshake procedure so as to open the connection with the IP source address.

2. The method according to claim 1, wherein intercepting the request comprises intercepting a first incoming packet comprising a field that is indicative of a number of hops traversed by the first incoming packet since having been sent from the source address, and making a record of a first value of the field appearing in the first incoming packet, and wherein analyzing the response comprises receiving a second incoming packet from the source address, and reading from the second incoming packet a second value of the field that is indicative of the number of hops traversed by the second incoming packet, and comparing the first and second values of the field in order to assess the legitimacy of the source address.

3. The method according to claim 2, wherein making the record comprises encoding the first value of the field in an outgoing packet, and wherein sending the reply comprises sending the outgoing packet to the source address, so as to cause the encoded first value to be incorporated in the second incoming packet.

4. The method according to claim 2, wherein the first, second and third packets are Internet Protocol (IP) packets, and wherein the field comprises a Time-To-Live (TTL) field in a header of the IP packets.

5. The method according to claim 4, wherein the protocol comprises a Transmission Control Protocol (TCP), and wherein encoding the first value comprises encoding the first value of the TTL field in an acknowledgment number field in a TCP header of the second packet.

6. The method according to claim 1, wherein intercepting the request comprises intercepting a first packet comprising a sequence number, and wherein sending the reply comprises sending a second packet to the source address, acknowledging the first packet and containing an acknowledgment number based on the sequence number in accordance with the protocol, and wherein analyzing the response comprises disqualifying the source address if the source address responds to the second packet.

7. The method according to claim 6, wherein analyzing the response comprises determining the source address to be legitimate if the source address retransmits the first packet without responding to the second packet.

8. The method according to claim 1, and comprising opening a proxy connection between a guard device and the source address, and permitting the source address to access the target computer only via the proxy connection as long as the legitimacy of the source address is not established.

9. The method according to claim 8, and comprising making a determination that the source address is legitimate responsively to use of the proxy connection, and responsively to the determination, causing the connection to be opened directly between the source address and the target computer while closing the proxy connection.

10. A method for authenticating communication traffic, comprising:

intercepting a SYN packet directed over a network from a source address to a target computer in accordance with a Transmission Control Protocol (TCP) three-way handshake procedure;

reading from the SYN packet a first value of a Time-To-Live (TTL) field;

sending to the IP source address a reply to the intercepted SYN request packet that deviates from the TCP three-way handshake procedure by sending a TCP ACK packet as a reply to the intercepted SYN request packet instead of a SYN ACK packet to the source address when opening a new TCP connection, while encoding the first value of the TTL field in a TCP acknowledgment number of the ACK packet;

receiving a TCP RST packet sent from the source address in response to the ACK packet;

reading a TCP sequence number and a second value of the TTL field from the RST packet; and comparing the TCP sequence number to the second value of the TTL field in order to assess legitimacy of the source address.

11. The method according to claim 10, wherein comparing the TCP sequence number comprises decoding the TCP sequence number in order to recover the first value of the TTL field, and determining the source address to be legitimate if the first and second values of the TTL field are equal to within a predetermined tolerance.

12. The method according to claim 10, and comprising sending a TCP SYN-ACK packet to the source address after a timeout period and, upon receiving an incoming TCP ACK packet from the source address in response to the SYN-ACK packet, permitting the source address to communicate with the target computer even if no RST packet was received in response to the ACK packet sent to the source address.

13. The method according to claim 12, wherein permitting the source address to communicate comprises opening a TCP proxy connection between a guard device and the source address, and permitting the source address to access the target computer via the proxy connection.

14. The method according to claim 10, and comprising, upon failing to determine the source address to be legitimate based upon receiving the RST packet:

reading a TCP sequence number from the SYN packet;

sending a further ACK packet to the source address, while setting a TCP acknowledgment number of the further ACK packet to a value greater by one than the sequence number of the SYN packet; and assessing the legitimacy of the source address based upon a further response received from the source address following the further ACK packet.

15. The method according to claim 10, and comprising permitting the source address to make a TCP connection directly with the target computer upon determining the source address to be legitimate, while permitting the source address to access the target computer only via a proxy connection as long as the legitimacy of the source address is not established.

16. A method for authenticating communication traffic, comprising:

intercepting a SYN packet directed over a network from a source address to a target computer in accordance with a Transmission Control Protocol (TCP) three-way handshake procedure, the SYN packet comprising a TCP sequence number;

sending to the IP source address a reply to the intercepted SYN request packet that deviates from the TCP three-way handshake procedure by sending a first TCP ACK packet as a reply to the intercepted SYN request packet instead of a SYN ACK packet to the source address when opening a new TCP connection, while setting a TCP acknowledgment number of the first ACK packet to a first value that is not greater by one than the sequence number of the SYN packet;

receiving a TCP RST packet sent from the source address in response to the first ACK packet;

responsively to receiving the TCP RST packet, sending a second ACK packet to the source address, while setting the TCP acknowledgment number of the second ACK packet to a second value that is greater by one than the sequence number of the SYN packet; and assessing legitimacy of the source address based upon a further response received from the source address following the further ACK packet.

17. The method according to claim 16, wherein assessing the legitimacy of the source address comprises determining the source address to be legitimate if a further TCP RST packet is not received from the source address in response to the second ACK packet.

18. A method for authenticating communication traffic, comprising:

intercepting a SYN packet directed over a network from a source address to a target computer in accordance with a Transmission Control Protocol (TCP) three-way handshake procedure;

reading a TCP sequence number from the intercepted SYN packet;

sending to the IP source address a reply to the intercepted SYN request packet that deviates from the TCP three-way handshake procedure by sending a TCP ACK packet as a reply to the intercepted SYN request packet instead of a SYN ACK packet to the source address when opening a new TCP connection, while setting a TCP acknowledgment number of the ACK packet to a value greater by one than the sequence number of the SYN packet; and upon receiving a TCP RST packet sent from the source address in response to the ACK packet, determining the source address to be illegitimate.

19. The method according to claim 18, and comprising receiving a retransmission of the SYN packet from the source address after a timeout, without having received the RST packet, and permitting the source address to make a TCP connection with the target computer responsively to the retransmission.

20. The method according to claim 18, wherein sending the TCP ACK packet comprises sending a first ACK packet, the method further comprising:

reading from the SYN packet a first value of a Time-To-Live (TTL) field;

in reply to the SYN packet, sending a second ACK packet to the source address, while encoding the first value of the TTL field in a TCP acknowledgment number of the second ACK packet;

receiving a further TCP RST packet sent from the source address in response to the second ACK packet;

reading the TCP sequence number and a second value of the TTL field from the further RST packet; and comparing the TCP sequence number of the further RST packet to the second value of the TTL field in order to assess legitimacy of the source address.

21. The method according to claim 18, wherein intercepting the SYN packet comprises intercepting a first SYN packet, and wherein sending the TCP ACK packet comprises sending a first ACK packet, the method further comprising:

intercepting a second SYN packet from the source address, subsequent to the first SYN packet;

reading from the second SYN packet a first value of a Time-To-Live (TTL) field;

in reply to the second SYN packet, sending a second ACK packet to the source address, while encoding the first value of the TTL field in a TCP acknowledgment number of the second ACK packet;

receiving a further TCP RST packet sent from the source address in response to the second ACK packet;

reading the TCP sequence number and a second value of the TTL field from the further RST packet; and comparing the TCP sequence number of the further RST packet to the second value of the TTL field in order to assess legitimacy of the source address.

22. The method according to claim 21, wherein intercepting the second SYN packet comprises receiving a retransmission of the first SYN packet from the source address, without having received the RST packet.

23. The method according to claim 18, and comprising permitting the source address to make a TCP connection directly with the target computer upon determining the source address to be legitimate, while permitting the source address to access the target computer only via a proxy connection as long as the legitimacy of the source address is not established.

24. Apparatus for authenticating an Internet Protocol (IP) source address in a Transmission Control Protocol (TCP) communication directed over a network to a target computer, comprising a guard device, which is coupled to intercept a SYN request from the IP source address to open a connection to the target computer in accordance with a TCP three-way handshake procedure, and is adapted to send to the IP source address a reply to the intercepted SYN request packet that deviates from the handshake procedure by sending a TCP ACK packet as a reply to the intercepted SYN request packet instead of a SYN ACK packet when opening a new TCP connection, to analyze a response from the IP source address to the TCP ACK reply in order to make an assessment of legitimacy of the IP source address, and upon determining, based on the assessment, that the IP source address is legitimate, to permit the target computer to complete the handshake procedure so as to open the connection with the IP source address.

25. The apparatus according to claim 24, wherein the request comprises a first incoming packet comprising a field that is indicative of a number of hops traversed by the first packet since having been sent from the source address, and wherein the guard device is adapted to make a record of a first value of the field appearing in the first incoming packet, and to read from the second incoming packet a second value of the field that is indicative of the number of hops traversed by the second incoming packet, and to compare the first and second values of the field in order to assess the legitimacy of the source address.

26. The apparatus according to claim 25, wherein the reply comprises an outgoing packet sent to the source address, and wherein the guard device is adapted to encode the first value of the field in the outgoing packet, so as to cause the encoded first value to be incorporated in the second incoming packet.

27. The apparatus according to claim 25, wherein the first, second and third packets are Internet Protocol (IP) packets, and wherein the field comprises a Time-To-Live (TTL) field in a header of the IP packets.

28. The apparatus according to claim 27, wherein the protocol comprises a Transmission Control Protocol (TCP), and wherein the guard device is adapted to encode the first value of the TTL field in an acknowledgment number field in a TCP header of the second packet.

29. The apparatus according to claim 24, wherein the request comprises a first packet comprising a sequence number, and wherein the reply comprises a second packet, sent by the guard device to the source address, such that the second packet acknowledges the first packet and contains an acknowledgment number based on the sequence number in accordance with the protocol, and wherein the guard device is adapted to disqualify the source address if the source address responds to the second packet.

30. The apparatus according to claim 29, wherein the guard device is adapted to determine the source address to be legitimate if the source address retransmits the first packet without responding to the second packet.

31. The apparatus according to claim 24, wherein the guard device is adapted to open a proxy connection with the source address, and to permit the source address to access the target computer only via the proxy connection as long as the legitimacy of the source address is not established.

32. The apparatus according to claim 31, wherein the guard device is adapted to make a determination that the source address is legitimate responsively to use of the proxy connection, and responsively to the determination, to cause the connection to be opened directly between the source address and the target computer while closing the proxy connection.

33. Apparatus for authenticating communication traffic, comprising a guard device, which is coupled to intercept a SYN packet directed over a network from a source address to a target computer in accordance with a Transmission Control Protocol (TCP) three-way handshake procedure, and is adapted to read from the intercepted SYN packet a first value of a Time-To-Live (TTL) field, and in reply to the intercepted SYN packet, to send a reply to the intercepted SYN request packet that deviates from the TCP three-way handshake procedure by sending a TCP ACK packet as a reply to the intercepted SYN packet instead of a SYN ACK packet to the source address when opening a new TCP connection, while encoding the first value of the TTL field in a TCP acknowledgment number of the ACK packet, wherein the guard device is coupled to receive a TCP RST packet sent from the source address in response to the ACK packet, and is adapted to read a TCP sequence number and a second value of the TTL field from the RST packet, and to compare the TCP sequence number to the second value of the TTL field in order to assess legitimacy of the source address.

34. The apparatus according to claim 33, wherein the guard device is adapted to decode the TCP sequence number in order to recover the first value of the TTL field, and to determine the source address to be legitimate if the first and second values of the TTL field are equal to within a predetermined tolerance.

35. The apparatus according to claim 33, wherein the guard device is further adapted to send a TCP SYN-ACK packet to the source address after a timeout period and, upon receiving an incoming TCP ACK packet from the source address in response to the SYN-ACK packet, to permit the source address to communicate with the target computer even if no RST packet was received in response to the ACK packet sent to the source address.

36. The apparatus according to claim 35, wherein the guard device is adapted to open a TCP proxy connection between the guard device and the source address, and to permit the source address to access the target computer via the proxy connection.

37. The apparatus according to claim 33, and wherein the guard device is adapted, upon failing to determine the source address to be legitimate based upon receiving the RST packet, to read a TCP sequence number from the SYN packet, to send a further ACK packet to the source address, while setting a TCP acknowledgment number of the further ACK packet to a value greater by one than the sequence number of the SYN packet, and to assess the legitimacy of the source address based upon a further response received from the source address following the further ACK packet.

38. The apparatus according to claim 33, wherein the guard device is adapted to permit the source address to make a TCP connection directly with the target computer upon determining the source address to be legitimate, while permitting the source address to access the target computer only via a proxy connection as long as the legitimacy of the source address is not established.

39. Apparatus for authenticating communication traffic, comprising a guard device, which is coupled to intercept a SYN packet directed over a network from a source address to a target computer in accordance with a Transmission Control Protocol (TCP) three-way handshake procedure, the SYN packet comprising a TCP sequence number, and which is adapted to send to the IP source address a reply to the intercepted SYN request packet that deviates from the TCP three-way handshake procedure by sending a first TCP ACK packet as a reply to the intercepted SYN packet instead of a SYN ACK packet to the source address when opening a new TCP connection, while setting a TCP acknowledgment number of the first ACK packet to a first value that is not greater by one than the sequence number of the SYN packet, and which is further adapted, upon receiving a TCP RST packet sent from the source address in response to the first ACK packet, to send a second ACK packet to the source address, while setting the TCP acknowledgment number of the second ACK packet to a second value that is greater by one than the sequence number of the SYN packet, and to assess legitimacy of the source address based upon a further response received from the source address following the further ACK packet.

40. The apparatus according to claim 39, wherein the guard device is adapted to determine the source address to be legitimate if a further TCP RST packet is not received from the source address in response to the second ACK packet.

41. Apparatus for authenticating communication traffic, comprising a guard device, which is coupled to intercept a SYN packet directed over a network from a source address to a target computer in accordance with a Transmission Control Protocol (TCP) three-way handshake procedure, and which is adapted to read a TCP sequence number from the intercepted SYN packet, to send to the IP source address a reply to the intercepted SYN request packet that deviates from the TCP three-way handshake procedure by sending a TCP ACK packet as a reply to the intercepted SYN packet instead of a SYN ACK packet to the source address when opening a new TCP connection, while setting a TCP acknowledgment number of the ACK packet to a value greater by one than the sequence number of the SYN packet, and to determine the source address to be illegitimate upon receiving a TCP RST packet sent from the source address in response to the ACK packet.

42. The apparatus according to claim 41, wherein the guard device is adapted to permit the source address to make a TCP connection with the target computer responsively to the retransmission upon receiving a retransmission of the SYN packet from the source address after a timeout, without having received the RST packet.

43. The apparatus according to claim 41, wherein the TCP ACK packet sent by the guard device is a first ACK packet, and wherein the guard device is further adapted to read from the SYN packet a first value of a Time-To-Live (TTL) field, and in reply to the SYN packet, to send a second ACK packet to the source address, while encoding the first value of the TTL field in a TCP acknowledgment number of the second ACK packet, and wherein the guard device is coupled to receive a further TCP RST packet sent from the source address in response to the second ACK packet, and is adapted to read the TCP sequence number and a second value of the TTL field from the further RST packet, and to compare the TCP sequence number of the further RST packet to the second value of the TTL field in order to assess legitimacy of the source address.

44. The apparatus according to claim 41, wherein the intercepted SYN packet comprises a first SYN packet, and wherein the TCP ACK packet sent by the guard device is a first ACK packet, and wherein the guard device is coupled to intercept a second SYN packet from the source address, subsequent to the first SYN packet, and is adapted to read from the second SYN packet a first value of a Time-To-Live (TTL) field, and to send a second ACK packet to the source address in reply to the second SYN packet, while encoding the first value of the TTL field in a TCP acknowledgment number of the second ACK packet, and wherein the guard device is coupled to receive a further TCP RST packet sent from the source address in response to the second ACK packet, and is adapted to read the TCP sequence number and a second value of the TTL field from the further RST packet, and to compare the TCP sequence number of the further RST packet to the second value of the TTL field in order to assess legitimacy of the source address.

45. The apparatus according to claim 44, wherein the second SYN packet comprises a retransmission of the first SYN packet from the source address, which is received by the guard device without the guard device having received the RST packet.

46. The apparatus according to claim 41, wherein the guard device is adapted to permit the source address to make a TCP connection directly with the target computer upon determining the source address to be legitimate, while permitting the source address to access the target computer only via a proxy connection as long as the legitimacy of the source address is not established.

47. A computer software product for authenticating an Internet Protocol (IP) source address in a Transmission Control Protocol (TCP) communication directed over a network to a target computer, the product comprising non-transitory computer readable tangible media, in which program instructions are stored, which instructions, when read by a guard computer, cause the guard computer to intercept a SYN request packet directed over a network from a source address to open a connection to a target computer in accordance with a TCP three-way handshake procedure, and further cause the guard computer to send to the IP source address a reply to the intercepted SYN request packet that deviates from the handshake procedure by sending to the IP source address a reply to the intercepted SYN request packet that deviates from the TCP three-way handshake procedure by sending a TCP ACK packet as a reply to the intercepted SYN request packet instead of a SYN ACK packet when opening a new TCP connection, to analyze a response from the IP source address to the TCP ACK reply in order to make an assessment of legitimacy of the IP source address, and upon determining, based on the assessment, that the IP source address is legitimate, to permit the target computer to complete the handshake procedure so as to open the connection with the IP source address.

48. The product according to claim 47, wherein the request comprises a first incoming packet comprising a field that is indicative of a number of hops traversed by the first packet since having been sent from the source address, and wherein the instructions cause the guard computer to make a record of a first value of the field appearing in the first incoming packet, and to read from the second incoming packet a second value of the field that is indicative of the number of hops traversed by the second incoming packet, and to compare the first and second values of the field in order to assess the legitimacy of the source address.

49. The product according to claim 48, wherein the reply comprises an outgoing packet sent to the source address, and wherein the instructions cause the guard computer to encode the first value of the field in the outgoing packet, so as to cause the encoded first value to be incorporated in the second incoming packet.

50. The product according to claim 48, wherein the first, second and third packets are Internet Protocol (IP) packets, and wherein the field comprises a Time-To-Live (TTL) field in a header of the IP packets.

51. The product according to claim 50, wherein the protocol comprises a Transmission Control Protocol (TCP), and wherein the instructions cause the guard computer to encode the first value of the TTL field in an acknowledgment number field in a TCP header of the second packet.

52. The product according to claim 47, wherein the request comprises a first packet comprising a sequence number, and wherein the reply comprises a second packet, sent by the guard computer to the source address, such that the second packet acknowledges the first packet and contains an acknowledgment number based on the sequence number in accordance with the protocol, and wherein the instructions cause the guard computer to disqualify the source address if the source address responds to the second packet.

53. The product according to claim 52, wherein the instructions cause the guard computer to determine the source address to be legitimate if the source address retransmits the first packet without responding to the second packet.

54. The product according to claim 47, wherein the instructions cause the guard computer to open a proxy connection with the source address, and to permit the source address to access the target computer only via the proxy connection as long as the legitimacy of the source address is not established.

55. The product according to claim 54, wherein the instructions cause the guard computer to make a determination that the source address is legitimate responsively to use of the proxy connection, and responsively to the determination, to cause the connection to be opened directly between the source address and the target computer while closing the proxy connection.

56. A computer software product for authenticating communication traffic, the product comprising non-transitory computer readable tangible media, in which program instructions are stored, which instructions, when read by a guard computer, cause the guard computer to intercept a SYN packet directed over a network from a source address to a target computer in accordance with a Transmission Control Protocol (TCP) three-way handshake procedure, and to read from the intercepted SYN packet a first value of a Time-To-Live (TTL) field, and to send to the IP source address a reply to the intercepted SYN request packet that deviates from the TCP three-way handshake procedure by sending a TCP ACK packet as a reply to the intercepted SYN packet instead of a SYN ACK packet to the source address when opening a new TCP connection, while encoding the first value of the TTL field in a TCP acknowledgment number of the ACK packet, wherein the instructions further cause the guard computer to receive a TCP RST packet sent from the source address in response to the ACK packet, and to read a TCP sequence number and a second value of the TTL field from the RST packet, and to compare the TCP sequence number to the second value of the TTL field in order to assess legitimacy of the source address.

57. The product according to claim 56, wherein the instructions cause the guard computer to decode the TCP sequence number in order to recover the first value of the TTL field, and to determine the source address to be legitimate if the first and second values of the TTL field are equal to within a predetermined tolerance.

58. The product according to claim 56, wherein the instructions further cause the guard computer to send a TCP SYN-ACK packet to the source address after a timeout period and, cause the guard computer, upon receiving an incoming TCP ACK packet from the source address in response to the SYN-ACK packet, to permit the source address to communicate with the target computer even if no RST packet was received in response to the ACK packet sent to the source address.

59. The product according to claim 58, wherein the instructions cause the guard computer to open a TCP proxy connection between the guard computer and the source address, and to permit the source address to access the target computer via the proxy connection.

60. The product according to claim 56, and wherein the instructions cause the guard computer, upon failing to determine the source address to be legitimate based upon receiving the RST packet, to read a TCP sequence number from the SYN packet, to send a further ACK packet to the source address, while setting a TCP acknowledgment number of the further ACK packet to a value greater by one than the sequence number of the SYN packet, and to assess the legitimacy of the source address based upon a further response received from the source address following the further ACK packet.

61. The product according to claim 56, wherein the instructions cause the guard computer to permit the source address to make a TCP connection directly with the target computer upon determining the source address to be legitimate, while permitting the source address to access the target computer only via a proxy connection as long as the legitimacy of the source address is not established.

62. A computer software product for authenticating communication traffic, the product comprising non-transitory computer readable tangible media, in which program instructions are stored, which instructions, when read by a guard computer, cause the guard computer to intercept a SYN packet directed over a network from a source address to a target computer in accordance with a Transmission Control Protocol (TCP) three-way handshake procedure, the intercepted SYN packet comprising a TCP sequence number, and further cause the guard computer to send to the IP source address a reply to the intercepted SYN request packet that deviates from the TCP three-way handshake procedure by sending a first TCP ACK packet as a reply to the intercepted SYN packet instead of a SYN ACK packet to the source address when opening a new TCP connection, while setting a TCP acknowledgment number of the first ACK packet to a first value that is not greater by one than the sequence number of the SYN packet, and which instructions further cause the guard computer, upon receiving a TCP RST packet sent from the source address in response to the first ACK packet, to send a second ACK packet to the source address, while setting the TCP acknowledgment number of the second ACK packet to a second value that is greater by one than the sequence number of the SYN packet, and to assess legitimacy of the source address based upon a further response received from the source address following the further ACK packet.

63. The product according to claim 62, wherein the guard device is adapted to determine the source address to be legitimate if a further TCP RST packet is not received from the source address in response to the second ACK packet.

64. A computer software product for authenticating communication traffic, the product comprising non-transitory computer readable tangible media, in which program instructions are stored, which instructions, when read by a guard computer, cause the guard computer to intercept a SYN packet directed over a network from a source address to a target computer in accordance with a Transmission Control Protocol (TCP) three-way handshake procedure, and further cause the guard computer to read a TCP sequence number from the intercepted SYN packet, and to send to the IP source address a reply to the intercepted SYN request packet that deviates from the TCP three-way handshake procedure by sending a TCP ACK packet as a reply to the intercepted SYN packet instead of a SYN ACK packet to the source address when opening a new TCP connection, while setting a TCP acknowledgment number of the ACK packet to a value greater by one than the sequence number of the SYN packet, and to determine the source address to be illegitimate upon receiving a TCP RST packet sent from the source address in response to the ACK packet.

65. The product according to claim 64, wherein the instructions cause the guard computer to permit the source address to make a TCP connection with the target computer responsively to the retransmission upon receiving a retransmission of the SYN packet from the source address after a timeout, without having received the RST packet.

66. The product according to claim 64, wherein the TCP ACK packet sent by the guard computer is a first ACK packet, and wherein the instructions cause the guard computer to read from the SYN packet a first value of a Time-To-Live (TTL) field, and in reply to the SYN packet, to send a second ACK packet to the source address, while encoding the first value of the TTL field in a TCP acknowledgment number of the second ACK packet, and wherein the instructions cause the guard computer to receive a further TCP RST packet sent from the source address in response to the second ACK packet, and to read the TCP sequence number and a second value of the TTL field from the further RST packet, and to compare the TCP sequence number of the further RST packet to the second value of the TTL field in order to assess legitimacy of the source address.

67. The product according to claim 64, wherein the intercepted SYN packet comprises a first SYN packet, and wherein the TCP ACK packet sent by the guard computer is a first ACK packet, and wherein the instructions cause the guard computer to intercept a second SYN packet from the source address, subsequent to the first SYN packet, and to read from the second SYN packet a first value of a Time-To-Live (TTL) field, and to send a second ACK packet to the source address in reply to the second SYN packet, while encoding the first value of the TTL field in a TCP acknowledgment number of the second ACK packet, and wherein the instructions cause the guard computer to receive a further TCP RST packet sent from the source address in response to the second ACK packet, and to read the TCP sequence number and a second value of the TTL field from the further RST packet, and to compare the TCP sequence number of the further RST packet to the second value of the TTL field in order to assess legitimacy of the source address.

68. The product according to claim 67, wherein the second SYN packet comprises a retransmission of the first SYN packet from the source address, which is received by the guard computer without the guard computer having received the RST packet.

69. The product according to claim 64, wherein the instructions cause the guard computer to permit the source address to make a TCP connection directly with the target computer upon determining the source address to be legitimate, while permitting the source address to access the target computer only via a proxy connection as long as the legitimacy of the source address is not established.

* * * * *